(12) United States Patent
Khandekar et al.

(10) Patent No.: US 9,071,609 B2
(45) Date of Patent: Jun. 30, 2015

(54) METHODS AND APPARATUS FOR PERFORMING DYNAMIC LOAD BALANCING OF PROCESSING RESOURCES

(71) Applicant: Motorola Mobility LLC, Libertyville, IL (US)

(72) Inventors: Milind M. Khandekar, Sunnyvale, CA (US); Jeyappragash J. Jeyakeerthi, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 235 days.

(21) Appl. No.: 13/646,815

(22) Filed: Oct. 8, 2012

(65) Prior Publication Data
US 2014/0101226 A1    Apr. 10, 2014

(51) Int. Cl.
*H04L 29/08* (2006.01)
*G06F 9/50* (2006.01)

(52) U.S. Cl.
CPC ........ *H04L 67/1008* (2013.01); *H04L 67/1029* (2013.01); *H04L 67/1031* (2013.01); *H04L 67/28* (2013.01); *G06F 9/505* (2013.01); *G06F 9/5055* (2013.01)

(58) Field of Classification Search
CPC ..... G06F 9/5005; G06F 9/505; G06F 9/5055; G06F 9/5083; H04L 47/125; H04L 67/1008; H04L 67/1029; H04L 67/1031
See application file for complete search history.

(56) References Cited

U.S. PATENT DOCUMENTS 8,001,247 B2    8/2011    Salevan et al.
2009/0070406 A1*    3/2009    Terpstra et al. ............... 709/203
(Continued)

FOREIGN PATENT DOCUMENTS

WO        0045277 A1    8/2000
WO    2004032396 A2    4/2004
(Continued)

OTHER PUBLICATIONS

Patent Cooperation Treaty, International Search Report and Written Opinion of the International Searching Authority for International Application No. PCT/US2013/059917, May 13, 2014, 11 pages.

*Primary Examiner* — Brian J Gillis
*Assistant Examiner* — Gil H. Lee
(74) *Attorney, Agent, or Firm* — Lerner, David, Littenberg, Krumholz & Mentlik, LLP

(57) ABSTRACT

A load balancer coupled between a network and a pool of processing resources utilizes a method for performing automatic, dynamic load balancing with respect to allocating the resources to handle processing requests received over the network. According to the method, the load balancer electronically receives registration requests from the processing resources and registers each resource from which a registration request was received. After the resources have been registered but before they are allocated to handle processing requests, the load balancer receives, from each registered resource, information relating to utilization of the resource. The utilization information may include operational metrics for the resource. Some time thereafter, the load balancer receives a request over the network to perform a server-related processing task. Responsive to the request, the load balancer allocates at least one of the registered resources to perform the requested processing task based at least on the previously received utilization information.

22 Claims, 5 Drawing Sheets

(56) References Cited

U.S. PATENT DOCUMENTS

2010/0107225 A1* 4/2010 Spencer et al. .................. 726/4
2011/0078303 A1* 3/2011 Li et al. ......................... 709/224
2013/0031562 A1   1/2013 Gusak

FOREIGN PATENT DOCUMENTS

WO       2010094829 A1     8/2010
WO    WO 2010094829 A1 *  8/2010

* cited by examiner

US 9,071,609 B2

METHODS AND APPARATUS FOR PERFORMING DYNAMIC LOAD BALANCING OF PROCESSING RESOURCES

FIELD OF THE INVENTION

The present invention relates generally to the allocation or provisioning of processing resources for handling network-originated processing requests and, more particularly, to methods and apparatus for performing dynamic load balancing of processing resources without manual load balancer configuration.

BACKGROUND

"Load balancing" is a term that typically refers to the distribution of incoming resource requests (e.g., from web browsers or other client applications) across servers in a server resource pool to avoid overloading any one server. Load balancing attempts to distribute incoming resource requests based on the load at each server to aid in ensuring server availability and, for Internet servers, defending against denial of service attacks.

Conventional load balancing is a static process in which a system administrator manually programs or otherwise configures a hardware device, known as a "load balancer," to allocate servers for resource request processing based upon preset criteria. The load balancer is typically arranged between the network from which resource requests are received, such as the Internet, and the server resource pool. A system administrator may configure a load balancer to allocate servers for processing incoming resource requests based on a variety of known balancing procedures, such as round robin, weighted (e.g., select one server or set of servers twice as often as another server or set of servers), least loaded (e.g., select the server that is least loaded), or least busy (e.g., select the server that is least busy, even though it may be more heavily loaded than another server). If the current load balancing configuration is not operating efficiently (e.g., based on historical data), the system administrator must access the load balancer and manually change the balancing configuration. As a result, conventional load balancing is static, requiring manual re-configuration from a system administrator any time the balancing needs adjustment.

An exemplary block diagram of a prior art computing system 100 with load balancing is illustrated in FIG. 1. The system 100 includes a static load balancer 101 and a resource pool 103. The resource pool 103 includes a plurality of processing resources, such as web, file transfer, or other servers 105-110 (six shown). The load balancer 101 is arranged between a network 112, such as the Internet or an intranet, and the resource pool 103. The network 112 communicates resource requests to the load balancer 101 from client applications 114, 115 executing in user devices 116, 117 connected to the network 112. Exemplary client applications 114, 115 include web browsers, file transfer protocol (FTP) clients, mobile applications, and scripts running periodically in automated systems.

Prior to being activated into the system 100, the load balancer 101 is manually configured by a system administrator to implement a static load balancing procedure. For example, the load balancer 101 may be configured to allocate servers 105-110 in a round robin manner responsive to incoming requests from client applications 114, 115 over the network 112. If server usage becomes unbalanced over time (e.g., due to certain requests requiring more server resources than others, certain servers being unavailable for periods of time, or certain servers being used more extensively for live testing of new software or software updates), the system administrator may manually re-configure the load balancer 101 so as to attempt to re-balance and/or equalize server usage. For example, the system administrator may change the allocation scheme from round robin to weighted or some other conventional allocation scheme, which is chosen in an attempt to balance server loading. However, system administrators typically adjust load balancer operation only periodically (e.g., once a week or once a month). As a result, manual re-balancing is inefficient and cannot readily adapt to real-time changes in network performance.

Additionally, conventional load balancing requires manual intervention when processing resources are added to the resource pool 103 because the new resources must be added to the balancing scheme configured in the load balancer 101. Such required manual intervention limits horizontal scalability of the load balancing function.

Figure 1:
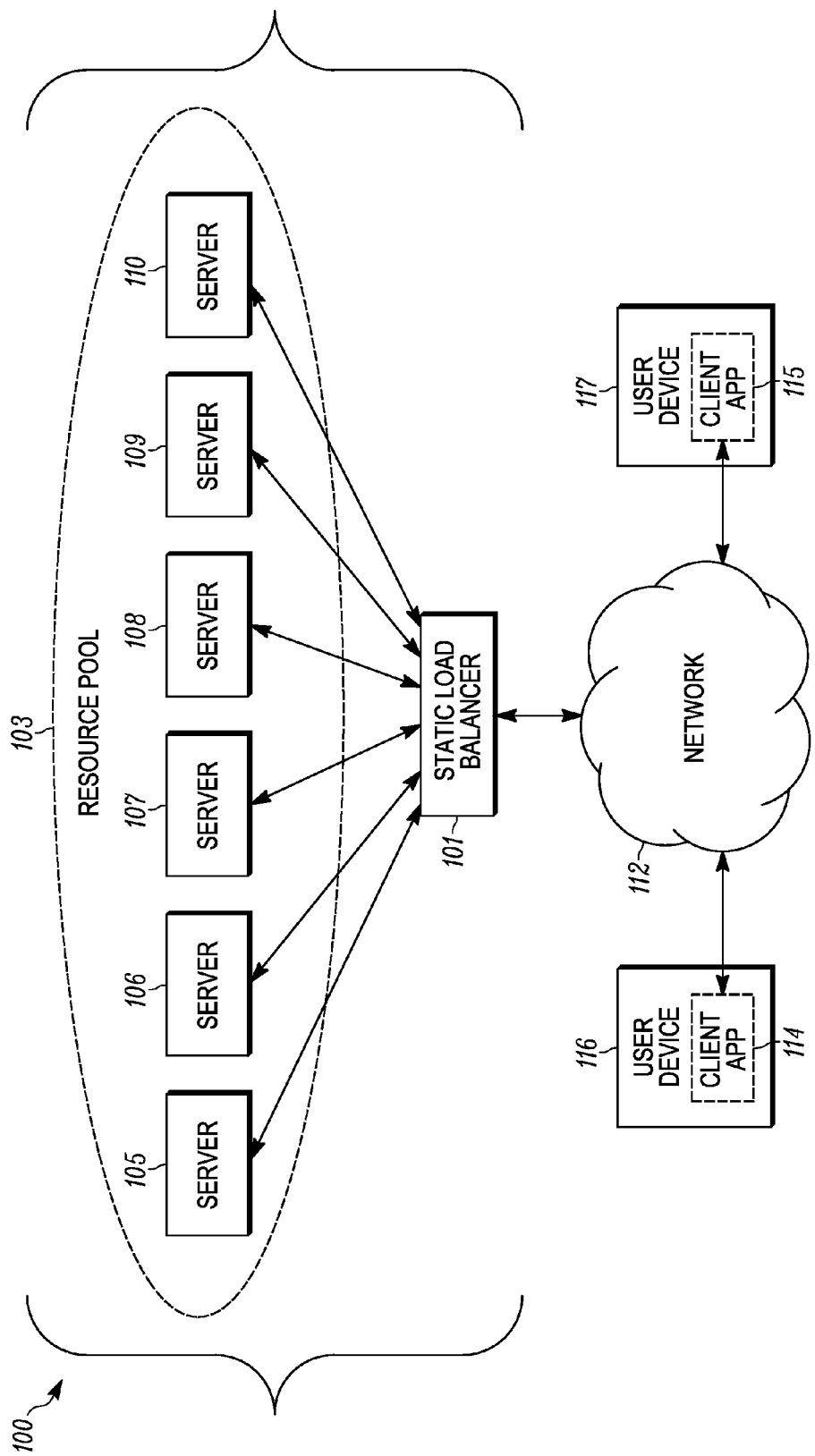
FIG. 1 illustrates a block diagram of a conventional computing system that utilizes static load balancing to allocate a pool of processing resources to perform processing requests received from client applications over a network.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various embodiments of the present invention.

DETAILED DESCRIPTION

Generally, the present invention encompasses methods and apparatus for performing dynamic load balancing of processing resources without manual load balancer configuration. According to one embodiment, a load balancer is coupled between a network and a group or pool of processing resources. The load balancer may be implemented as a hardware device or as a software process within a resource pool controller or one of the processing resources (e.g., a server). The load balancer electronically receives registration requests from at least some of the processing resources from within the pool of resources. The load balancer registers each processing resource from which a registration request is received.

During or after registration of the processing resources with the load balancer, the load balancer receives, from each registered processing resource, information relating to utilization of the resource. Such information may include operational metrics, such as bandwidth costs, memory used, network input and output ports, central processing unit (CPU) usage, swap memory usage, operating system cache, quantity of processor operations executed in total or over a predefined period of time, or any other operational or utilization metrics that may enable the load balancer to determine a current or prior utilization level for the resource. In one embodiment, each registered processing resource maintains a script that is remotely executable by the load balancer either during (e.g., as part of) or after the registration process. The script may enable the load balancer to request or retrieve utilization information from the particular processing resource and may define the particular format in which the utilization information is provided (e.g., in a predefined data structure). Information regarding the script, such as a uniform resource locator (URL) link to the script, a remote procedure call, or other information that allows the load balancer to remotely execute the script, may be provided to the load balancer during the registration of the particular processing resource.

Some time after processing resources have registered with the load balancer, the load balancer receives a request to perform a server-related processing task from a client application over the network. Responsive to receiving the processing request, the load balancer allocates at least one of the registered processing resources to perform the requested processing task based at least on the utilization information previously received from the processing resources (and optionally the processing requirements of the requested task). The load balancer may select the processing resource or resources to which to allocate the requested task based on most recently received utilization information for the registered processing resources, historical utilization information for the registered processing resources, or a combination of both types of utilization information.

According to an alternative embodiment, the load balancer may inform a registered resource of the load balancer's upcoming unavailability by remotely executing a notification script maintained by the registered resource. According to one embodiment, the notification script may enable the load balancer to send an unavailability notification to the registered resource to allow the resource to register with another load balancer or otherwise obtain load balancing assistance. The notification script may be run on demand, according to a schedule (e.g., where the load balancer has a pre-established offline maintenance schedule), or as otherwise necessary. Information regarding the notification script (e.g., a URL link to the script, a remote procedure call, or other information that allows the load balancer to remotely execute the script) may have been provided to the load balancer during the registration of the registered resource.

In an alternative embodiment, the load balancing provided by the load balancer may be configured as a service supplied to the processing resources. In such a case, the load balancer may electronically communicate its address information (e.g., Internet Protocol (IP) address) to at least one address resolution server on the network. The address information would enable the pool of processing resources to determine an electronic address of the load balancer through communication with the address resolution server(s). The address resolution server may be a domain name system (DNS) server or a directory server. For example, the load balancer may publish its IP address to a set of DNS servers and the processing resources may send DNS service (SRV) record locator queries to the DNS servers (e.g., such as when the processing resources come online) to determine the IP address of the load balancer prior to commencing registration with the load balancer.

In a further embodiment, processing resources within the pool may be configured to assist the load balancer in performing the dynamic load balancing. According to this embodiment, each processing resource generates information relating to its utilization and commences a registration sequence with the load balancer. Additionally, each processing resource may maintain a script that is remotely executable by the load balancer, wherein the script, when executed by the load balancer, enables the load balancer to request or retrieve the utilization information from the particular processing resource. Responsive to execution of the script (which may occur either during or after registration of the processing resource with the load balancer), the processing resource communicates the utilization information to the load balancer, thereby enabling the load balancer to use the utilization information to dynamically allocate the pool of processing resources.

By performing load balancing based on utilization information obtained from registered processing resources, the present invention enables a load balancer to automatically and dynamically allocate the registered processing resources without requiring manual configuration or re-configuration by a system administrator. Additionally, the present invention permits cloud computing environments to be treated as part of a pool of processing resources by establishing communication between the load balancer and cloud computing management applications, such as orchestration layers, to enable the load balancer to determine the utilization capabilities of server instances within the cloud computing environments. Further, the present invention facilitates horizontal scaling of load balancing by allowing additional load balancers to be added as registered processing resources without requiring any manual configuration.

Figure 2:
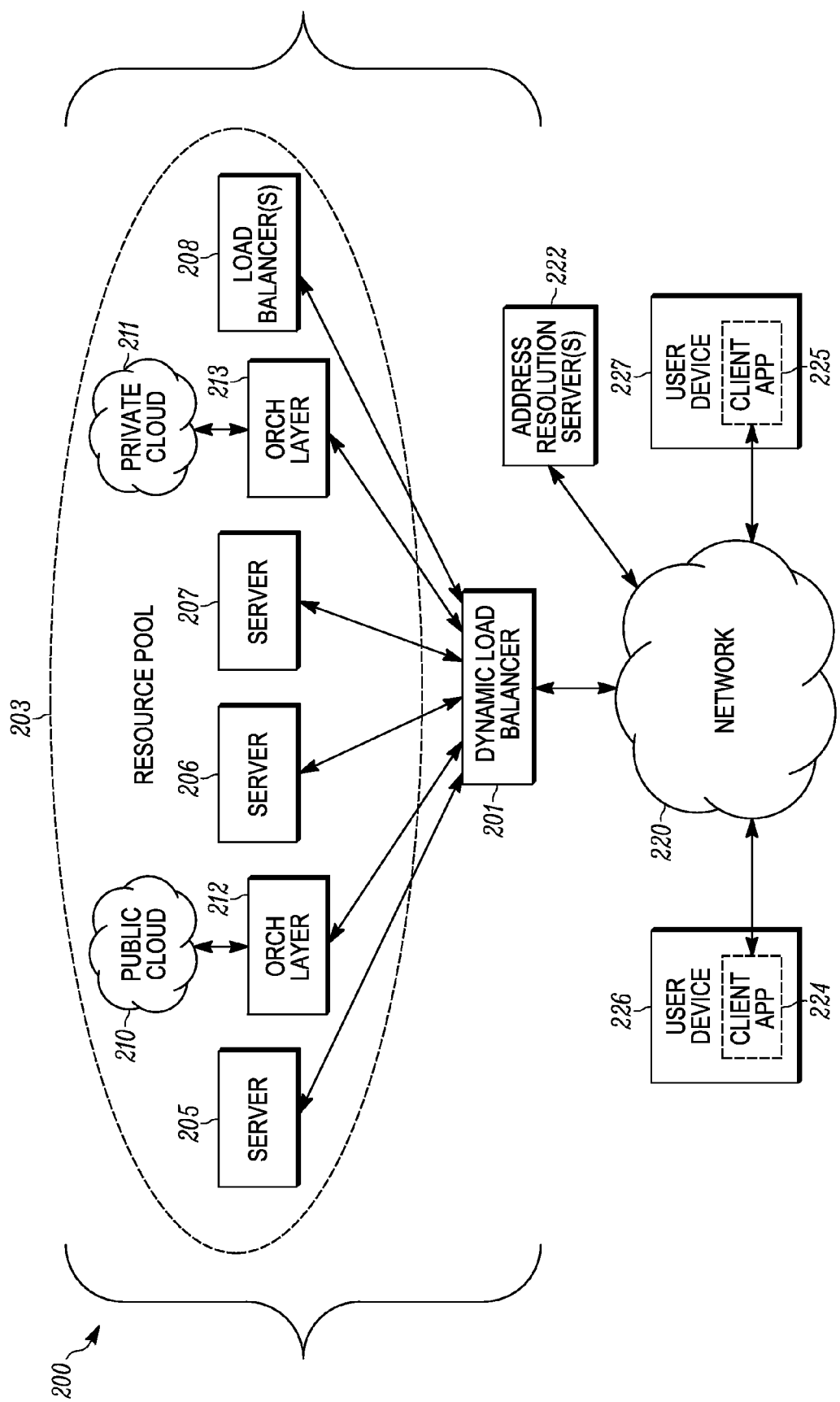
FIG. 2 illustrates a block diagram of a computing system that utilizes dynamic load balancing to allocate a pool of processing resources to perform processing requests received from client applications over a network, in accordance with an exemplary embodiment of the present invention.

Embodiments of the present invention can be more readily understood with reference to FIGS. 2-5, in which like reference numerals designate like items. FIG. 2 is a block diagram of a computing system 200 that utilizes dynamic load balancing to allocate a group or pool of processing resources 203 to perform processing requests received from client applications 224, 225 over a network 220, in accordance with an exemplary embodiment of the present invention. The computing system 200 includes a dynamic load balancer 201 and the pool of processing resources 203. The pool of resources 203 may include servers 205-207 (three shown for illustration purposes), one or more additional load balancers 208 (one shown for illustration purposes), one or more public cloud computing environments 210 (one shown for illustration purposes), one or more private cloud computing environments 211 (one shown for illustration purposes), management system applications associated with allocating processing resources (e.g., orchestration layers 212, 213 for managing allocation of cloud server instances), and/or any other forms of processing resources or processing resource controllers. When additional load balancers 208 are included in the pool of processing resources 203 allocatable by the dynamic load balancer 201, such load balancers 208 function to allocate processing resources under their control in response to requests from the dynamic load balancer 201. Use of load balancers 208 as processing resources 203 enables the computing system 200 to be scaled as necessary to meet the computing needs of various client applications 224, 225 (two shown for illustration purposes) being executed on associated, remotely located user devices 226, 227, such as computers, cell phones, smart phones, gaming devices, DVD players, set top boxes, televisions, or any other user controllable device coupled to a network 220.

The dynamic load balancer 201 may be a hardware device and/or a software process coupled between a network 220, such as the Internet or a company intranet, and the resource pool 203. Thus, the load balancer 201 may be implemented as a management program executing on its own server, blade within a server, or other computing device or system. Alternatively, the load balancer 201 may be a software process operating on one of the resources of the resource pool 203 and thereby share hardware resources with the resource in which it is installed. An exemplary block diagram of physical and/or logical components of the load balancer 201 is illustrated in FIG. 3 and described below.

Pursuant to one embodiment of the present invention, the load balancer 201 publishes its network address (e.g., Internet Protocol (IP) address) to one or more address resolution servers 222 (one shown for illustration purposes) on or coupled to the network 220. The address resolution servers 222 may be domain name system (DNS) servers, directory servers, or any other servers that may be accessed by the pool 203 of processing resources to discover or otherwise determine the network address and optionally port number of the load balancer 201. The network address and port number of the load balancer 201 may be stored as a DNS service (SRV) record within the address resolution server 222, where such server 222 is a DNS server. By publishing its network address to one or more address resolution servers 222, the load balancer 201 may effectively function as a load balancing service that may be discovered and utilized by processing services or applications executing on resources within the resource pool 203. For example, but not by way of limitation, operating system startup processes or other applications executing on the resources within the resource pool 203 (such as servers 205-207) may be programmed or configured to contact one or more address resolution servers 222 on the network 220 to determine the network address and/or port number of the load balancer 201 through which the processing resources desire to receive network-originated processing requests. Operation of the dynamic load balancer 201, exemplary processing resources, and the computing system 200 incorporating them will be described in more detail below with respect to FIGS. 4 and 5.

Figure 3:
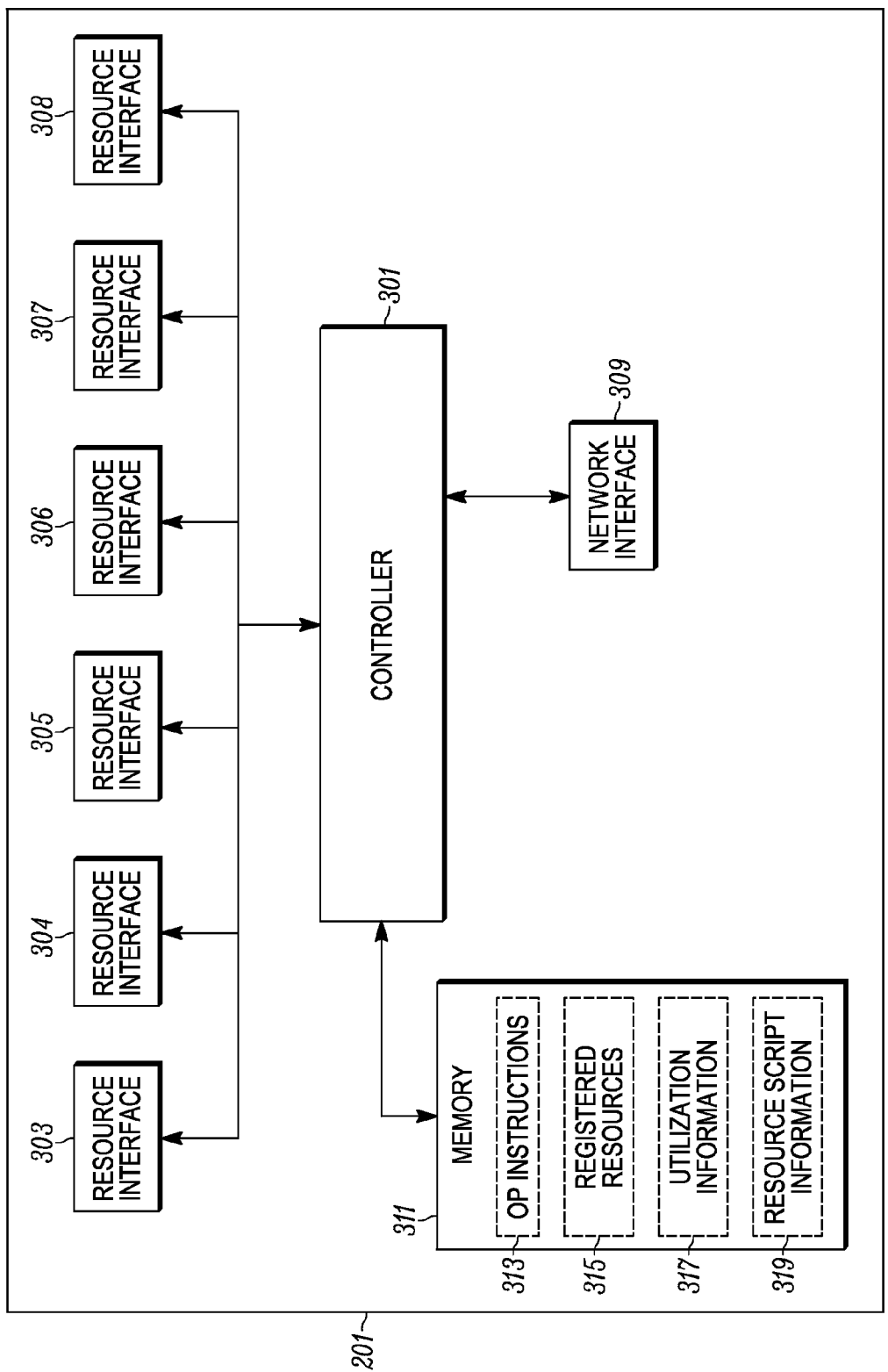
FIG. 3 illustrates a block diagram of the dynamic load balancer of FIG. 2, in accordance with an exemplary embodiment of the present invention.

FIG. 3 illustrates a block diagram of the dynamic load balancer 201 of FIG. 2, in accordance with an exemplary embodiment of the present invention. According to this embodiment, the load balancer 201 includes a controller 301, a plurality of resource interfaces 303-308 (six shown for illustration purposes and to correspond to the six links between the load balancer 201 and the resources 205-208, 212-213 as shown in FIG. 2), at least one network interface 309 (one shown for illustration purposes), and memory 311. The controller 301 may be a microcontroller, a microprocessor, or any other processing device or group of processing devices operable in accordance with operating instructions 313 stored in the memory 311. For example, the controller 301 may be a special purpose controller, where the load balancer 201 is implemented as a software-controlled, stand alone hardware device. Alternatively, the controller 301 may be implemented as the control portion of a software process executed by a multi-purpose controller or processor, where the load balancer 201 is implemented as a software process.

The controller 301 is physically and/or logically coupled to the resource interfaces 303-308, the memory 311, and the network interface 309. The resource interfaces 303-308 may be physical interfaces, such as, for example, Ethernet interfaces, short-range wireless interfaces (e.g., Wi-Fi interfaces), wide area wireless interfaces (e.g., 3G or 4G digital cellular interfaces), token ring interfaces, fiber distributed data interfaces (FDDIs), asynchronous transfer mode (ATM) interfaces, integrated services digital network (ISDN) interfaces, or any other conventional wired or wireless interfaces for communicating high speed data between computing devices or equipment. Alternatively, and more preferably, the resource interfaces 303-308 are logical interfaces (e.g., transmission control protocol/Internet protocol (TCP/IP) virtual ports) that share a single physical interface, such as an Ethernet interface, for connecting to corresponding resources in the resource pool 203. The resource interfaces 303-308 facilitate the exchange of messages between the load balancer controller 301 and the processing resources of the resource pool 203.

The network interface 309 may be a physical or logical interface for connecting the load balancer 201 to the network 220, depending upon whether the load balancer 201 is implemented as a separate software-controlled, hardware device or as a software application or group of software applications operating in a multi-purpose server. Where the network interface 309 is a physical interface, the network interface 309 may be an Ethernet interface, a fiber optic or hybrid fiber/cable interface, a cable interface, an ISDN interface, a digital subscriber line (DSL) interface, a short-range wireless interface (e.g., a Wi-Fi interface), a wide area wireless interface (e.g., a 3G or 4G digital cellular interface), or any other conventional wired or wireless interface for communicating data between the load balancer 201 and the network 220.

The memory 311 may include any form of conventional memory, such has a hard drive, random access memory, read only memory, programmable read only memory, cache memory, and/or any other forms of memory that are internal or connectable to the load balancer 201 or a computing device that includes the load balancer 201. The memory 311 may be used to store operating instructions 313 (e.g., an operating system and other programs that, when executed by the controller 301, cause the load balancer 201 to operate in accordance with the present invention), a listing of registered processing resources 315, registered resource utilization information 317, registered resource script information 319, configuration data, address information (e.g., IP address, media access layer (MAC) address, and other networking addresses), and any other information necessary for operation of the load balancer 201 in accordance with the present invention. The listing of registered processing resources 315, the registered resource utilization information 317, and the registered resource script information 319 may be stored and inter-related in an appropriate relational database.

Where the address information includes an IP address, the IP address may be stored in the memory 311 either as a static IP address during provisioning of the load balancer 201 or after being dynamically assigned through use of an address assignment protocol, such as the Dynamic Host Configuration Protocol (DHCP), by an address assignment server (e.g., DHCP server) on a network 220 to which the load balancer 201 is connected. As described in more detail below, the listing of registered processing resources 315 is produced and modified as processing resources register and deregister with the load balancer 201. Additionally, the registered resource utilization information 317 is stored and updated as such information is acquired from registered processing resources. Further, the resource script information 319 may be stored and updated as such information is received from registered processing resources (e.g., as processing resources register and deregister with the load balancer 201).

Figure 4:
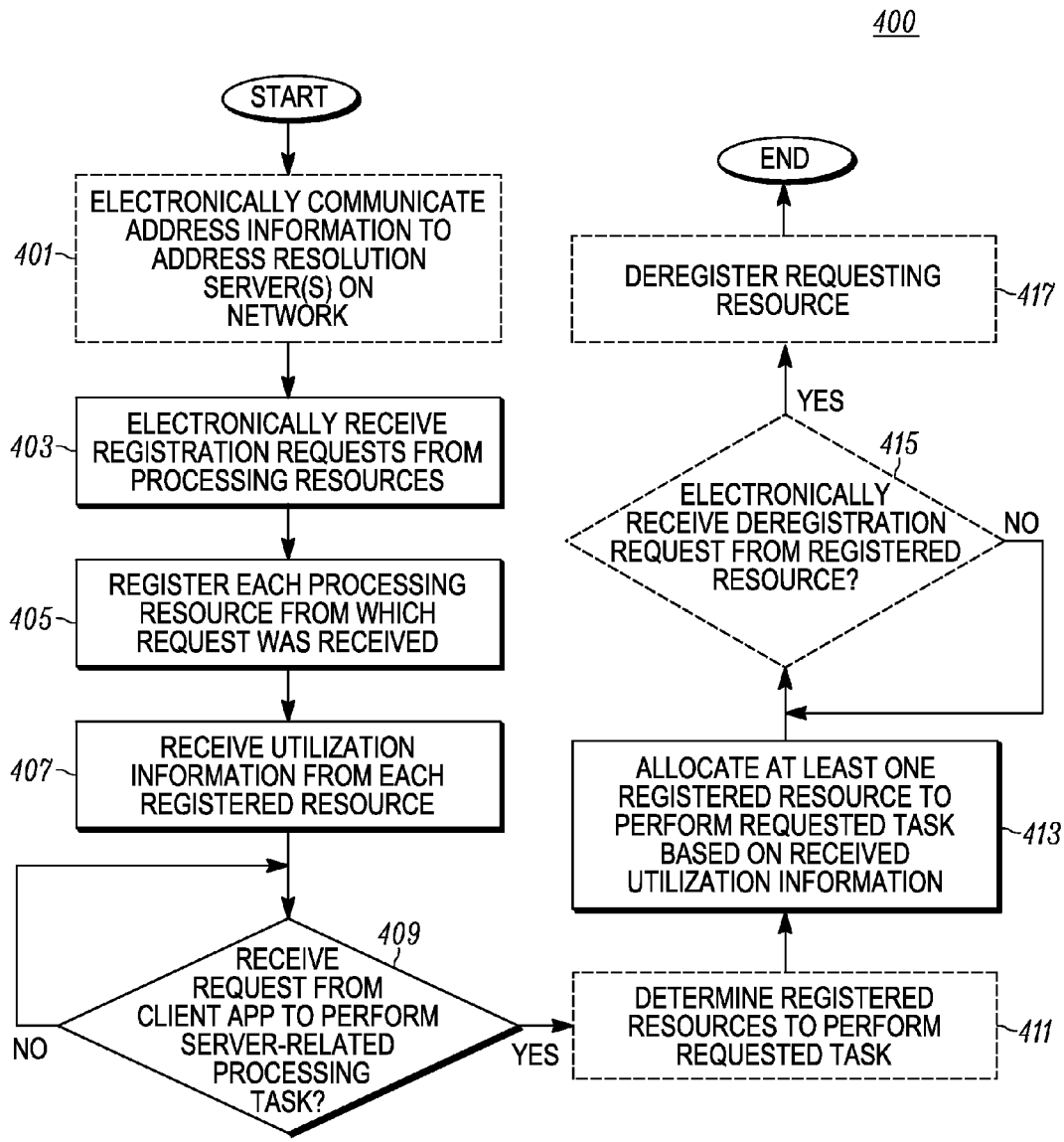
FIG. 4 is a logic flow diagram of steps executed by a load balancer to perform dynamic load balancing, in accordance with an exemplary embodiment of the present invention.

FIG. 4 is a logic flow diagram 400 of steps executed by a load balancer 201 to perform dynamic load balancing, in accordance with an exemplary embodiment of the present invention. The logic flow steps illustrated in FIG. 4 may be performed by the controller 301 of the load balancer 201 in accordance with operating instructions 313 stored in a computer-readable storage medium, such as the memory 311 of the load balancer 201. Alternatively, the operating instructions 313 for implementing the logic flow of FIG. 4 may be stored in one or more other computer-readable storage media that are electronically accessible by a processor or controller, such as the load balancer's controller 301, forming part of the computing system 200.

Pursuant to the depicted logic flow, the load balancer 201 optionally, but preferably, electronically communicates (401) its address information (e.g., hostname and IP or other network address) to one or more address resolution servers 222 on a network 220 to which the load balancer 201 is connected. For example, the load balancer 201 may send its network address to a set of preselected address resolution servers 222 as part of the load balancer's startup or boot up process. The address resolution servers 222 to which the load balancer's address information is sent may be those most likely to be accessed by the processing resources during startup or at other appropriate times when the processing resources need to determine network addresses to which to send data. Communication of the load balancer's address information to address resolution servers 222, such as DNS servers, enables the processing resources to automatically discover the load balancer 201 in the same way that network addresses for other hostnames or services are discovered.

Some time after communicating its address information to one or more address resolution servers 222 or at some other points in time when processing resources of the resource pool 203 desire to utilize the load balancing services of the load balancer 201, the load balancer 201 electronically receives (403) registration requests from the processing resources. For example, in one embodiment in which the load balancer 201 communicated its address information to one or more address resolution servers 222 on the network 220, the load balancer 201 may receive a registration request from a processing resource after the processing resource had obtained the load balancer's network address from an address resolution server 222 on the network 220. Alternatively, the load balancer 201 may receive a registration request from a processing resource during startup, boot up, or reboot of the processing resource, where the processing resource has been preprogrammed with the network address of the load balancer 201.

Responsive to receiving the registration requests, the load balancer 201 registers (405) each processing resource from which a registration request was received. According to one embodiment of the present invention, registration of a processing resource involves a sequence or series of message exchanges (e.g., a protocol) between the load balancer 201 and the registering resource. As part of the registration sequence or protocol, the registering resource may communicate a variety of information to the load balancer 201, including the resource's identification (e.g., resource name), network address, and communication port, and optionally information regarding one or more scripts that may be remotely executed on the resource when the load balancer 201 requires utilization information from the resource or wishes to communicate load balancer event information to the resource. The load balancer's utilization of the optional scripts is described in more detail below.

Once a processing resource has been registered, an entry for the resource is created in the listing of registered resources 315 maintained in the load balancer's memory 311. Each entry in the registered resource listing 315 may include information necessary for use by the load balancer 201, such as resource network address, resource availability status, resource utilization information, and communication port number. When the registered resource supplied information related to one or more scripts that may be remotely executed on the resource by the load balancer 201, such information may be stored in the load balancer's memory 311 as registered resource script information 319.

As noted above, the load balancer 201 may communicate its address information to one or more address resolution servers 222 at boot up or at any other time which the load balancer 201 desires to become discoverable by processing resources coupled to the network 220. Additionally, each processing resource in the resource pool 203 may register with the load balancer 201 when initially being booted up in the computing system 200, when being rebooted, such as after offline maintenance, or at any other time prior to utilizing the load balancing service provided by the load balancer 201.

Some time after the load balancer 201 has registered a particular processing resource, the load balancer 201 receives (407) utilization information 317 from the registered resource. The utilization information 317 received from the registered resource may include operational metrics for the resource. For example, the operational metrics may include, inter alia, bandwidth used, bandwidth costs, memory used, network input and output ports, CPU usage, swap memory usage, operating system cache, quantity of processor operations executed in total or over a predefined period of time, or any other operational or utilization metrics that may enable the load balancer 201 to determine current, prior, and/or historical utilization levels for the registered processing resource. Alternatively or additionally, where the registered resource is a cloud computing environment (e.g., private cloud environment, public cloud environment, and/or hybrid cloud environment), the utilization information 317 may be received from a cloud computing management system application, such as an orchestration layer 212, 213, and the utilization information 317 may relate to utilization of server instances in the cloud computing environment 210, 211 managed by the cloud computing management system application.

According to one embodiment, the utilization information 317 may be acquired from the registered resource through the load balancer controller's remote execution of a utilization information script, or other equivalent script or program, maintained by or included within the registered resource. In such a case, the details for calling or executing the utilization information script were preferably supplied by the registered resource during registration with the load balancer 201 and are stored in load balancer memory 311, as discussed above. When executed by the load balancer 201, the utilization information script may enable the load balancer 201 to retrieve utilization information 317 from the registered resource according to a procedure set forth in the script. For example, the utilization information script may enable the load balancer 201 to retrieve a data structure stored in the registered resource. In such a case, the data structure may include information relating to utilization of the resource. Because the utilization information script is remotely executable by the load balancer 201, the script allows the load balancer 201 to repeatedly retrieve the registered resource's utilization information 317, whether as a data structure or otherwise. For example, the script may allow the load balancer 201 to periodically retrieve the registered resource's utilization information (e.g., hourly, daily, weekly, etc.), retrieve the utilization information according to an aperiodic schedule, retrieve the utilization information responsive to one or more triggers (e.g., after the load balancer 201 receives a predetermined quantity of processing requests or after the registered resource performs a predetermined quantity of processing tasks), or retrieve the utilization information responsive to manually input, on-demand queries from a system administrator. The received utilization information 317 may be stored in load balancer memory 311.

The registered resource may also or alternatively include or maintain a notification script that is remotely executable by the load balancer 201. In such a case, the details for calling or executing the notification script were preferably supplied by the registered resource during registration with the load balancer 201 and are stored in load balancer memory 311, as discussed above. When executed by the load balancer 201, the notification script enables the load balancer 201 to inform the registered processing resource as to upcoming events involving the load balancer 201 (e.g., upcoming unavailability of the load balancer 201, such as for maintenance, software update testing, or otherwise) and to alternatively inform the registered resource to shut down or take such other action as may be consistent with becoming unsupported by the load balancer 201. The notification script may also enable the load balancer 201 to provide information to the registered resource identifying another load balancer that will be available in the load balancer's absence to provide load balancing services to the registered resource.

When used, the utilization information script and the notification script may be any programs or other executables that enable the load balancer's controller 301 to remotely retrieve information from or provide information to a registered resource by sending instructions to the registered resource to execute the applicable script. Such programs or executables include, inter alia, remote method invocation (RMI) scripts; common object request broker architecture (CORBA) scripts; JAVA servlets, PYTHON methods, or other published web applications which can function as hypertext transfer protocol (HTTP) endpoints; or representational state transfer (REST) implementations, such as RESTful uniform resource locators (URLs).

Some time after the load balancer 201 has registered two or more processing resources from the resource pool 203 and received utilization information 317 from the registered resources, the load balancer 201 determines (409) whether a request to perform a server-related or similar processing task has been received from a client application 224, 225 over the network 220. Such a request may include, inter alia, a request to perform a simple query language (SQL) query, a request to perform a file transfer protocol (FTP) transfer, a web query or RESTful command over HTTP, or a mobile communication request over the extensible messaging and presence protocol (XMPP). One exemplary request to perform an SQL query may be received from a web browser serving as the client application 224, 225 when a user of the browser requests a search by an Internet search engine. Another exemplary request to perform a server-related task may be received from a client application executing on a wireless device (e.g., a smart phone or tablet computer), where the client application desires to receive data from an associated server application that acquires or stores the data (e.g., a stock quote application or an email application).

Responsive to receiving a server-related processing task request, the load balancer 201 optionally determines (411) which registered resources are capable of performing the requested processing task. The processing capabilities of a registered resource may be determined through current or prior execution of a utilization script maintained by the registered resource, such as during registration of the registered resource or at other times thereafter as desired by the load balancer 201 or as configured into the utilization script. In one embodiment, the load balancer's controller 301 may store in memory 311 the utilization information 317 received from the registered resource as a result of executing the utilization script. In such a case, the processing capabilities of the registered resource may be determined through evaluation of the resource's previously stored utilization information 317.

The utilization information 317 obtained from registered processing resources essentially indicates the processing capabilities of the registered resources and enables the load balancer 201 to determine which processing resources are or are not capable of performing particular processing tasks (e.g., such as where one set of processing resources are configured to handle one set of processing tasks and another set of resources are configured to handle another set of processing tasks). Alternatively, the processing capabilities of a particular processing resource may be manually entered and stored in the memory 311 of the load balancer 201 prior to configuring the processing resource in the computing system 200. In such a case, the load balancer 201 could retrieve the resource's processing capabilities after the resource registered with the load balancer 201 and prior or responsive to receipt of the processing task request.

After the load balancer 201 determines processing resource capabilities, or responsive to receipt of a requested processing task request for which processing resource capabilities are not required to be determined prior to resource allocation, the load balancer 201 allocates (413) at least one registered processing resource to perform the requested processing task based on the previously received and optionally stored resource utilization information 317. For example, the load balancer 201 may compare utilization information 317 for the registered resources (or a subset of the registered resources determined to have sufficient processing capabilities for the particular processing task) to various associated criteria to determine which resource or resources to allocate to the requested processing task. In one exemplary embodiment, the load balancer 201 may select one or more registered resources having a maximum amount (or the least amount) of bandwidth costs, a maximum amount (or the least amount) of memory previously used, a minimum amount of operating system cache, and a maximum amount of prior processor operations over a selected time period (e.g., an hour, several hours, a day, several days, and so forth).

If more resources meet the criteria than are necessary to perform the processing task, the load balancer 201 may select the appropriate quantity of resources to which to allocate the requested processing task from the set of criteria-meeting resources (e.g., in a round robin manner or otherwise). In an alternative embodiment, the load balancer 201 may select one or more registered resources to perform a particular processing task in such a way as to meet the processing needs of the request, while also achieving other objectives. For instance, the load balancer 201 may select processing resources running different versions of an application needed to perform a particular processing task (e.g., one or more resources running a newer version of the server application and one or more resources running a current version of the server application) so as to perform the requested task while contemporaneously testing the new version of the server application. While two exemplary embodiments have been described above illustrating how processing resource utilization information may be used to allocate one or more registered resources to perform a requested processing task, one of ordinary skill in the art will readily recognize and appreciate that resource utilization information may be used in a variety of other ways to perform registered resource allocation and the appended claims are intended to encompass all such possible variations.

Some time after the load balancer 201 has registered one or more processing resources, the load balancer 201 may optionally determine (415) whether it has electronically received a deregistration request from a registered processing resource. When a deregistration request has been received, the load balancer 201 deregisters (417) the requesting resource and removes the resource from the list of registered resources 315 stored in memory 311. The load balancer 201 may also remove stored utilization information 317 for the deregistered resource from memory 311 to free memory resources for storing information related to newly registered resources.

Figure 5:
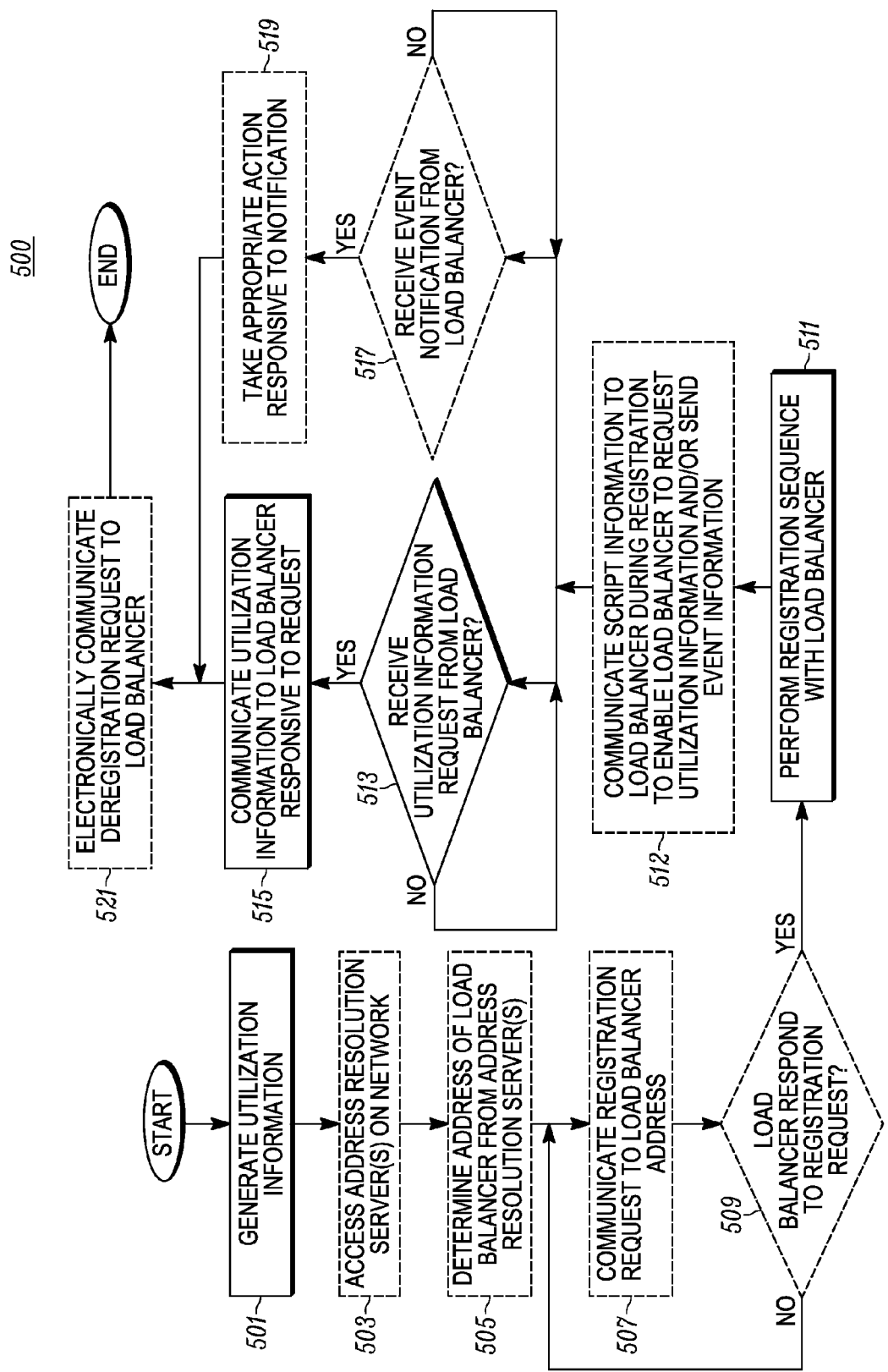
FIG. 5 is a logic flow diagram of steps executed by each of a plurality of processing resources to facilitate dynamic load balancing of the processing resources by a load balancer, in accordance with an exemplary embodiment of the present invention.

FIG. 5 is a logic flow diagram 500 of steps executed by each of a plurality of processing resources to facilitate dynamic load balancing of the processing resources by a load balancer 201, in accordance with an exemplary embodiment of the present invention. The logic flow steps illustrated in FIG. 5 may be performed by a processor of a processing resource in accordance with operating instructions stored in a memory of the resource or in a memory accessible by the resource.

Pursuant to the depicted logic flow, the processing resource generates (501) and stores utilization information on a regular basis during its operation. As discussed above, the utilization information may include a variety of different operational metrics and historical usage data for the resource. Additionally, the utilization information may be generated by the processing resource through execution of a script remotely initiated by the load balancer 201. The generated utilization information may be in the form of a data structure that is understandable by the load balancer 201. The generated utilization information is preferably communicated to the load balancer 201 as discussed below.

When the processing resource desires to subscribe to or register with a load balancing service provided by the load balancer 201 (e.g., as in accordance with a startup sequence of the processing resource), the processing resource optionally accesses (503) one or more address resolution servers 222 on a network 220 to which the load balancer 201 and the processing resource are communicatively coupled. Such network 220 may be a public network, such as the Internet, or a private network, such as corporate intranet. In one exemplary embodiment, the startup process for the processing resource may communicate a hostname query for the load balancer 201 to the address resolution server(s) 222 for purposes of determining the network address of the load balancer 201. For example, where the network 220 to which the load balancer 201 is coupled is the Internet, the address resolution server 222 may be a DNS server and the processing resource may access the DNS server by communicating a DNS service record locator query to the DNS server through use of a known network administration tool, such as domain information groper (dig) or name server lookup (nslookup). The DNS service record locator is stored at the DNS server and may include the hostname, communication port, and network address (e.g., IP address) for the load balancer 201. By having the processing resource discover the load balancer 201 from one or more address resolution servers 222, the present invention eliminates the need to manually configure the load balancer 201 for each processing resource added to the resource pool 203.

Responsive to accessing the address resolution server(s) 222, the processing resource determines (505) a network address of the load balancer 201 from the address resolution server(s) 222. For example, responsive to receiving the hostname query (e.g., a DNS service record locator query), the address resolution server 222 may return the network address and port number for the load balancer 201 to the processing resource, thereby enabling the processing resource to determine the load balancer's network address.

After the network address of the load balancer 201 has been determined (if necessary), the processing resource may optionally communicate (507) a registration request to the load balancer's network address in accordance with a registration/deregistration protocol programmed into the load balancer 201 and the processing resource. The processing resource then determines (509) whether the load balancer 201 responded to the registration request in accordance with the registration/deregistration protocol. If the load balancer 201 has not responded to the registration request within a predetermined timeout period, the processing resource may re-communicate (507) the registration request to the load balancer's network address.

On the other hand, if the load balancer 201 has responded to the registration request or the processing resource has knowledge of the load balancer's network address by some other means (e.g., the load balancer's network address is preconfigured into the processing resource), the processing resource performs (511) a registration sequence with the load balancer 201 according to either the registration/deregistration protocol already in process or another registration protocol commenced upon determination or retrieval of the load balancer's network address. The registration sequence may include sending identification information for the processing resource to the load balancer 201, as well as communicating (512) information to the load balancer 201 relating to one or more remotely executable scripts maintained by the processing resource. One such script may enable the load balancer 201 to request or retrieve the utilization information generated and maintained by the processing resource. Another such script may enable the load balancer 201 to communicate load balancer-related event information (such as load balancer availability/unavailability information) to the processing resource during the time period that the processing resource is registered with the load balancer 201 and the load balancer 201 is providing load balancing services to the processing resource.

During or after the registration sequence, the processing resource determines (513) whether it has received a utilization information request from the load balancer 201. As explained above, the utilization information request may be an HTTP request or some other request to execute a utilization script residing in the processing space of the processing resource. If a utilization information request has been received, the processing resource communicates (515) its utilization information to the load balancer 201 responsive to the request. The utilization information may be communicated through supply of a data structure that includes the processing resource's utilization information in a pre-arranged format readable by the load balancer 201. If a utilization information request has not yet been received, the processing resource continues to monitor for such a request from the load balancer 201.

Besides monitoring for a utilization information request from the load balancer 201, the processing resource may also determine (517) whether it has received an event notification from the load balancer 201. In one embodiment, the event notification may be received through the load balancer's remote execution of a notification script residing in the processing space of the processing resource. If an event notification has been received, the processing resource takes appropriate action (519) responsive to the notification. For example, if the event notification indicates that the load balancer 201 is going offline, the processing resource may search for another load balancer to provide load balancing services. If an event notification has not yet been received, the processing resource continues to monitor for an event notification from the load balancer 201.

Finally, after being registered with the load balancer 201, the processing resource may elect to deregister from the load balancing service provided by the load balancer 201. When such deregistration is desired, the processing resource electronically communicates (521) a deregistration request to the load balancer 201 in accordance with the registration/deregistration protocol programmed into the load balancer 201 and the processing resource. The processing resource may elect to deregister from the load balancer 201 because it is not currently needed to perform processing tasks (e.g., the resource is a peak load resource), it is going offline for maintenance or software upgrades or downgrades, it is being replaced with a new processing resource (e.g., an end-of-life event), or it elects to deregister responsive to receiving an event notification from the load balancer 201 (e.g., when the load balancer 201 notifies the processing resource that the load balancer 201 is going offline).

The present invention encompasses methods and apparatus for performing dynamic load balancing of processing resources without manual load balancer configuration. With this invention, load balancing may be provided as a discoverable service to which processing resources may automatically subscribe or register. Registered resources may then be automatically and dynamically allocated by a load balancer without requiring manual configuration or re-configuration of the load balancer when processing resources register and deregister from the load balancing service. Additionally, the present invention permits cloud computing environments to be treated as part of a pool of registrable processing resources by establishing inter-communication between the load balancer and cloud computing management applications, such as orchestration layers, to enable the load balancer to manage allocation of server instances within the cloud computing environments. Further, the present invention facilitates horizontal scaling of the load balancing service by allowing additional load balancers to be added as processing resources registered with a primary load balancer. The additional load balancers may in turn provide load balancing services to their own sets of registered resources, thereby making the additional load balancers appear as available server resources.

As detailed above, embodiments of the present invention reside primarily in combinations of method steps and/or apparatus components related to performing dynamic load balancing of processing resources in a computing system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the load balancer 201 or any of the processing resources described herein may be comprised of one or more conventional processors and unique stored program instructions that control the processor(s) to implement, in conjunction with certain non-processor circuits, some, most, or all of the functions of the load balancer 201 or a processing resource and its operational methods as described herein. The non-processor circuits may include, but are not limited to, storage devices, such as internal memory 311, and various interfaces, such as resource interfaces 303-308 and network interfaces 309. As such, the functions of these non-processor circuits may be interpreted as steps of a method to perform dynamic load balancing of processing resources or to otherwise manage allocation of a plurality of processing resources to perform server-related processing tasks requested by client applications over a network. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for a load balancer to manage allocation of a plurality of processing resources to perform server-related processing tasks requested by client applications over a network, the method comprising:

electronically receiving registration requests from at least some of the plurality of processing resources;

registering each processing resource from which a registration request was received to produce registered processing resources;

receiving, from each registered processing resource, information relating to utilization of the registered processing resource to collectively produce utilization information, the receiving comprising remotely executing a script at the registered processing resource that enables the load balancer to retrieve a data structure from the registered processing resource, wherein the data structure includes the information relating to utilization of the registered processing resource;

in response to receiving the information relating to utilization of the registered processing resource, updating a list of received information relating to the utilization of the processing resources at the load balancer;

receiving a request to perform a server-related processing task from a client application over the network; and responsive to the request to perform the server-related processing task, allocating at least one of the registered processing resources to perform the server-related processing task based on the utilization information.

2. The method of claim 1, further comprising:
electronically communicating address information for the load balancer to at least one address resolution server on the network, the address information enabling the plurality of processing resources to determine an electronic address of the load balancer through communication with the at least one address resolution server;
wherein electronically receiving registration requests from at least some of the plurality of processing resources occurs subsequent to communicating the address information to the at least one address resolution server.

3. The method of claim 1, wherein receiving information relating to utilization of the registered processing resource comprises:
remotely executing a script at the registered processing resource, the script enabling the load balancer to retrieve the utilization information from the registered processing resource.

4. The method of claim 3, further comprising:
receiving information regarding the script from the registered processing resource during registration with the load balancer.

5. The method of claim 1, wherein the information relating to utilization of the registered processing resource includes operational metrics for the registered processing resource.

6. The method of claim 5, wherein the operational metrics include at least one of memory used, network input and output ports, central processing unit usage, swap memory usage, operating system cache, and quantity of processor operations executed.

7. The method of claim 1, further comprising:
remotely executing a notification script at a particular registered processing resource, the notification script notifying the particular registered processing resource of an event related to the load balancer.

8. The method of claim 1, further comprising:
electronically receiving a deregistration request from a registered processing resource; and
deregistering the registered processing resource from which the deregistration request was received.

9. The method of claim 1, wherein the plurality of processing resources includes at least one of: servers, one or more cloud computing environments, and one or more additional load balancers.

10. The method of claim 1, wherein receiving, from each registered processing resource, information relating to utilization of the registered processing resource comprises:
receiving, from a cloud computing management system application, information relating to utilization of server instances in an associated cloud computing environment when the plurality of processing resources includes the cloud computing environment.

11. The method of claim 10, wherein the cloud computing management system application is an orchestration layer.

12. The method of claim 1, wherein the load balancer is implemented as at least one of a hardware device and a software process within a host computing system coupled to the network.

13. A computing system for implementing a load balancer, the computing system comprising:
one or more interfaces for interfacing the computing system to one or more networks and to a plurality of processing resources; and
a controller coupled to the one or more interfaces, the controller being configured to:
electronically receive registration requests from at least some of the plurality of processing resources;
register each processing resource from which a registration request was received to produce registered processing resources;
receive, from each registered processing resource, information relating to utilization of the registered processing resource to collectively produce utilization information, the receiving comprising remotely executing a script at the registered processing resource that enables the load balancer to retrieve a data structure from the registered processing resource, wherein the data structure includes the information relating to utilization of the registered processing resource;
update a list of received information relating to the utilization of the processing resources at the load balancer;
receive a request to perform a server-related processing task from a client application over a network; and
responsive to the request to perform the server-related processing task, allocate at least one of the registered processing resources to perform the server-related processing task based on the utilization information.

14. The computing system of claim 13, wherein the one or more networks include at least one address resolution server and wherein the controller is further configured to:
electronically communicate address information for the load balancer to the at least one address resolution server, the address information enabling the plurality of processing resources to determine an electronic address of the load balancer through communication with the at least one address resolution server; and
electronically receive the registration requests from at least some of the plurality of processing resources subsequent to communication of the address information to the at least one address resolution server.

15. The computing system of claim 14, wherein the at least one address resolution server comprises at least one domain name system server.

16. The computing system of claim 13, wherein the plurality of processing resources includes a cloud computing environment, wherein allocation of server instances in the cloud computing environment is controlled by a cloud computing management system application, and wherein the controller is configured to receive information relating to utilization of the server instances in the cloud computing environment from the cloud computing management system application.

17. A non-transitory computer-readable storage medium including instructions that, when executed by a computing system, cause the computing system to:
electronically receive registration requests from at least some of a plurality of processing resources;
register each processing resource from which a registration request was received to produce registered processing resources;

receive, from each registered processing resource, information relating to utilization of the registered processing resource to collectively produce utilization information, the receiving comprising remotely executing a script at the registered processing resource that enables the load balancer to retrieve a data structure from the registered processing resource, wherein the data structure includes the information relating to utilization of the registered processing resource;

update a list of received information relating to the utilization of the processing resources at the load balancer;

receive a request to perform a server-related processing task from a client application over a network to which the computing system is communicatively coupled; and responsive to the request to perform the server-related processing task, allocate at least one of the registered processing resources to perform the server-related processing task based on the utilization information.

18. A method for a processing resource to assist a load balancer in performing dynamic load balancing, the processing resource being one of a plurality of processing resources allocatable by the load balancer and capable of performing server-related processing tasks as requested by remotely-executing client applications, the method comprising:

generating information relating to utilization of the processing resource to produce utilization information;

performing a registration sequence with the load balancer;

subsequent to the registration sequence, receiving a request for the utilization information from the load balancer;

executing a script at the processing resource that enables the load balancer to retrieve the requested utilization information; and communicating the requested utilization information to the load balancer responsive to the request, the communication enabling the load balancer to update a list of received information relating to the utilization of the processing resources.

19. The method of claim 18, further comprising: prior to performing the registration sequence:

accessing an address resolution server on a network to which the load balancer is communicatively coupled;

determining an address of the load balancer from the address resolution server; and communicating a registration request to the address of the load balancer as determined from the address resolution server.

20. The method of claim 18, further comprising:

communicating information relating to a script to the load balancer during the registration sequence, wherein the script resides in a processing space of the processing resource and, when remotely executed by the load balancer, notifies the processing resource of an event related to the load balancer; and executing the script responsive to instructions from the load balancer.

21. The method of claim 18, further comprising:

communicating information relating to a script to the load balancer during the registration sequence, wherein the script resides in a processing space of the processing resource and, when remotely executed by the load balancer, causes the processing resource to communicate the utilization information to the load balancer; and executing the script responsive to an instruction from the load balancer, wherein the instruction corresponds to the request for the utilization information.

22. The method of claim 1, further comprising:

electronically communicating a deregistration request to the load balancer after the processing resource has been registered with the load balancer.

* * * * *